US010956451B2

(12) United States Patent
Zhou

(10) Patent No.: US 10,956,451 B2
(45) Date of Patent: Mar. 23, 2021

(54) TIME-SERIES DATA PROCESSING METHOD, RECORDING MEDIUM HAVING RECORDED THEREON TIME-SERIES DATA PROCESSING PROGRAM, AND TIME-SERIES DATA PROCESSING DEVICE

(71) Applicant: SCREEN Holdings Co., Ltd., Kyoto (JP)

(72) Inventor: JingLong Zhou, Kyoto (JP)

(73) Assignee: SCREEN Holdings Co., Ltd.

( * ) Notice: Subject to any disclaimer, the term of this patent is extended or adjusted under 35 U.S.C. 154(b) by 653 days.

(21) Appl. No.: 15/298,849

(22) Filed: Oct. 20, 2016

(65) Prior Publication Data
US 2017/0116319 A1    Apr. 27, 2017

(30) Foreign Application Priority Data

Oct. 26, 2015   (JP) .............................. JP2015-209607

(51) Int. Cl.
| | |
|---|---|
| *G06F 16/28* | (2019.01) |
| *G06F 16/904* | (2019.01) |
| *G06F 17/18* | (2006.01) |
| *G06K 9/62* | (2006.01) |
| *G06K 9/00* | (2006.01) |
| *G06F 11/00* | (2006.01) |
| *G06F 7/08* | (2006.01) |
| *G06F 17/40* | (2006.01) |

(52) U.S. Cl.
CPC .............. *G06F 16/285* (2019.01); *G06F 7/08* (2013.01); *G06F 11/00* (2013.01); *G06F 16/904* (2019.01); *G06F 17/18* (2013.01); *G06K 9/00536* (2013.01); *G06K 9/6284* (2013.01); *G06F 17/40* (2013.01)

(58) Field of Classification Search
CPC ....................................................... G06F 17/30
USPC ....................................................... 707/737
See application file for complete search history.

(56) References Cited

U.S. PATENT DOCUMENTS

| | | | |
|---|---|---|---|
| 4,910,688 A | 3/1990 | Amini ....................... | 364/551.01 |
| 6,289,257 B1 | 9/2001 | Sekine .......................... | 700/121 |

(Continued)

FOREIGN PATENT DOCUMENTS

| | | |
|---|---|---|
| CN | 104025276 A | 9/2014 |
| JP | 2004-054393 A | 2/2004 |

(Continued)

*Primary Examiner* — Kim T Nguyen
(74) *Attorney, Agent, or Firm* — Ostrolenk Faber LLP

(57) ABSTRACT

A group generating section generates, from a plurality of pieces of time-series data, a plurality of groups each made up of a plurality of pieces of time-series data that change in a similar manner. A normalization section linearly transforms, for each group, data included in the time-series data in the group so that a maximum value and a minimum value of median values included in median-value time-series data are transformed to 1 and 0, respectively. An abnormality degree calculating section obtains, for each group, an average value of differences between pieces of data of the same time for every combination of two pieces of time-series data in the group, to take a maximum value of the obtained average values as an abnormality degree of the group. A ranking generating section generates a group ranking based on the abnormality degrees of the groups. The group rankings are displayed.

15 Claims, 14 Drawing Sheets

(56) References Cited

U.S. PATENT DOCUMENTS

| | | | | |
|---|---|---|---|---|
| 7,424,409 B2* | 9/2008 | Ben-Gal | ............... | G06K 9/6282 |
| | | | | 703/2 |
| 8,316,026 B2* | 11/2012 | Uchino | ................. | G06F 16/951 |
| | | | | 707/737 |
| 8,352,471 B2* | 1/2013 | Oami | ...................... | G06F 16/51 |
| | | | | 707/737 |
| 8,392,419 B2* | 3/2013 | Heaton | ................... | G06F 19/00 |
| | | | | 707/737 |
| 8,700,516 B2* | 4/2014 | Bell | ........................ | G06Q 40/06 |
| | | | | 705/36 R |
| 8,702,908 B1 | 4/2014 | Mast et al. | .................... | 162/198 |
| 8,712,740 B2* | 4/2014 | Morio | .................... | G01H 17/00 |
| | | | | 703/2 |
| 8,909,641 B2* | 12/2014 | Bullotta | .................. | H04L 43/08 |
| | | | | 707/736 |
| 2003/0208286 A1 | 11/2003 | Abercrombie | .................. | 700/31 |
| 2006/0178835 A1 | 8/2006 | Marks | ............................. | 702/19 |
| 2010/0214296 A1 | 8/2010 | Kawamura | .................... | 345/440 |
| 2011/0239045 A1 | 9/2011 | Nakatsugawa et al. | ........ | 714/26 |
| 2013/0024172 A1* | 1/2013 | Suyama | ............. | G05B 23/0232 |
| | | | | 703/2 |
| 2013/0110761 A1 | 5/2013 | Viswanathan et al. | ......... | 706/52 |
| 2013/0204827 A1* | 8/2013 | Kawachi | ............ | G01N 33/2841 |
| | | | | 706/46 |
| 2017/0004625 A1* | 1/2017 | Kamiyama | ........... | G06T 7/0016 |

FOREIGN PATENT DOCUMENTS

| | | |
|---|---|---|
| JP | 2009-251874 A | 10/2009 |
| JP | 2010-271997 A | 12/2010 |
| JP | 2011-209879 A | 10/2011 |
| JP | 2012-18589 A | 1/2012 |
| JP | 2015-026252 A | 2/2015 |
| KR | 10-1047013 B1 | 7/2011 |
| WO | WO 2013/067573 A1 | 5/2013 |

* cited by examiner

INPUT ANALYSIS PERIOD INFORMATION.

DATABASE  database_#003

START DATE AND TIME  2015/10/16  20:05:00

END DATE AND TIME  2015/10/16  20:40:00

ANALYSIS-TARGET PROCESS  WAFER WASHING PROCESS

TIME-SERIES DATA PROCESSING METHOD, RECORDING MEDIUM HAVING RECORDED THEREON TIME-SERIES DATA PROCESSING PROGRAM, AND TIME-SERIES DATA PROCESSING DEVICE

BACKGROUND OF THE INVENTION

Field of the Invention

The present invention relates to digital data processing and, more particularly, to a time-series data processing method, a recording medium having recorded thereon a time-series data processing program, and a time-series data processing device.

Description of Related Art

As a method for detecting abnormality of an apparatus or a device, there is known a method of analyzing time-series data obtained by measuring, by using a sensor or the like, a physical quantity (e.g., length, angle, time, velocity, force, pressure, voltage, current, temperature, flow rate, etc.) which indicates an operating state of the apparatus or the device, and sequentially arranging the measured results in time-series order. When the apparatus or the device performs the same operation in the same condition, the time-series data change in a similar manner if there is no abnormality. Hence, it is possible to specify a place where abnormality has occurred and a cause of the abnormality, by mutually comparing a plurality of pieces of time-series data that change in a similar manner, detecting abnormal time-series data, and then analyzing the detected data.

For example, a semiconductor manufacturing device includes a plurality of processing units, and each processing unit measures operation data indicating an operating state, at predetermined time intervals. In many cases, the plurality of processing units perform the same operation on semiconductor substrates in the same condition. Thus, it is possible to specify a unit where abnormality has occurred and a cause of the abnormality, by mutually comparing a plurality of pieces of time-series data obtained by the plurality of processing units.

In association with the present invention, Japanese Laid-Open Patent Publication No. 2012-18589 describes an apparatus data display device for sorting and displaying a plurality of pieces of time-series data in ascending or descending order of a specified time or time period.

For example, when time-series data obtained in the semiconductor manufacturing device is to be analyzed, such problems as follows occur. First, since each of the processing units measures operation data with high frequency over a long time, an amount of time-series data is enormous. Hence it takes a long time to perform the processing of detecting abnormal time-series data out of the enormous amount of time-series data. Further, a method for determining whether or not data is abnormal and a method for selecting a processing unit to be an analysis target differ depending on an operator who analyzes time-series data. Moreover, a method for quantitatively proving whether or not the analyzed result is correct and a method for preferably comparing different kinds of time-series data (e.g., temperature and flow rate) are not known. Similar problems also occur when another time-series data is to be analyzed.

SUMMARY OF THE INVENTION

Accordingly, an object of the present invention is to provide a time-series data processing method, a recording medium having recorded thereon a time-series data processing program, and a time-series data processing device, for displaying time-series data in such a manner as to facilitate a user to analyze the data.

For achieving the above object, the present invention has the following features.

According to a first aspect of the present invention, there is provided a time-series data processing method for processing a plurality of pieces of time-series data, the method including: a group generating step of generating a plurality of groups each made up of a plurality of pieces of time-series data that change in a similar manner, based on a given plurality of pieces of time-series data; a normalization step of normalizing, for each group, the time-series data in the group by the same transformation; an abnormality degree calculating step of calculating, for each group, an abnormality degree of the group based on the normalized time-series data; a ranking generating step of generating a group ranking based on the abnormality degrees of the groups; and a result displaying step of displaying a screen that includes the group ranking.

According to a second aspect of the present invention, in the first aspect of the present invention, the abnormality degree calculating step obtains, for each group, an average value of differences between pieces of data of the same time for every combination of two pieces of time-series data in the group, to take a maximum value of the obtained average values as an abnormality degree of the group.

According to a third aspect of the present invention, in the second aspect of the present invention, the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively.

According to a fourth aspect of the present invention, in the first aspect of the present invention, the abnormality degree calculating step calculates, for each time-series data in each group, an abnormality degree of the time-series data based on the normalized time-series data, the ranking generating step generates, for each group, a time-series data ranking based on the abnormality degrees of the time-series data, and the result displaying step displays a screen that includes the time-series data ranking for a group selected by a display control instruction.

According to a fifth aspect of the present invention, in the fourth aspect of the present invention, the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively, and the abnormality degree calculating step takes, for each time-series data in each group, a sum of differences in pieces of data of the same time between the time-series data and the median-value time-series data, as an abnormality degree of the time-series data.

According to a sixth aspect of the present invention, in the fourth aspect of the present invention, the screen that includes the group ranking includes link information for displaying a screen that includes the time-series data ranking.

According to a seventh aspect of the present invention, there is provided a computer readable recording medium having recorded thereon a time-series data processing program for processing a plurality of pieces of time-series data, the time-series data processing program causing a computer to execute, by a CPU using a memory: a group generating step of generating a plurality of groups each made up of a plurality of pieces of time-series data that change in a similar manner, based on a given plurality of pieces of time-series data; a normalization step of normalizing, for each group, the time-series data in the group by the same transformation; an abnormality degree calculating step of calculating, for each group, an abnormality degree of the group based on the normalized time-series data; a ranking generating step of generating a group ranking based on the abnormality degrees of the groups; and a result displaying step of displaying a screen that includes the group ranking.

According to an eighth aspect of the present invention, in the seventh aspect of the present invention, the abnormality degree calculating step obtains, for each group, an average value of differences between pieces of data of the same time for every combination of two pieces of time-series data in the group, to take a maximum value of the obtained average values as an abnormality degree of the group.

According to a ninth aspect of the present invention, in the eighth aspect of the present invention, the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively.

According to a tenth aspect of the present invention, in the seventh aspect of the present invention, the abnormality degree calculating step calculates, for each time-series data in each group, an abnormality degree of the time-series data based on the normalized time-series data, the ranking generating step generates, for each group, a time-series data ranking based on the abnormality degrees of the time-series data, and the result displaying step displays a screen that includes the time-series data ranking for a group selected by a display control instruction.

According to an eleventh aspect of the present invention, in the tenth aspect of the present invention, the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively, and the abnormality degree calculating step takes, for each time-series data in each group, a sum of differences in pieces of data of the same time between the time-series data and the median-value time-series data, as an abnormality degree of the time-series data.

According to a twelfth aspect of the present invention, in the tenth aspect of the present invention, the screen that includes the group ranking includes link information for displaying a screen that includes the time-series data ranking.

According to a thirteenth aspect of the present invention, there is provided a time-series data processing device for processing a plurality of pieces of time-series data, the device including: a group generating section for generating a plurality of groups each made up of a plurality of pieces of time-series data that change in a similar manner, based on a given plurality of pieces of time-series data; a normalization section for normalizing, for each group, the time-series data in the group by the same transformation; an abnormality degree calculating section for calculating, for each group, an abnormality degree of the group based on the normalized time-series data; a ranking generating section for generating a group ranking based on the abnormality degrees of the groups; and a result displaying section for displaying a screen that includes the group ranking.

According to a fourteenth aspect of the present invention, in the thirteenth aspect of the present invention, the abnormality degree calculating section obtains, for each group, an average value of differences between pieces of data of the same time for every combination of two pieces of time-series data in the group, to take a maximum value of the obtained average values as an abnormality degree of the group.

According to a fifteenth aspect of the present invention, in the fourteenth aspect of the present invention, the normalization section generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively.

According to the first, seventh, or thirteenth aspect of the present invention, time-series data that change in a similar manner are grouped, an abnormality degree of the group is calculated based on normalized time-series data, and a group ranking based on the abnormality degrees of the groups is displayed on a screen. Therefore, a user can easily recognize a group that includes abnormal time-series data. Further, by preferentially analyzing the group that includes abnormal time-series data, the user can analyze time-series data easily.

According to the second, eighth, or fourteenth aspect of the present invention, the maximum value of average values of differences between pieces of data of the same time in a pair of time-series data is calculated for each group. Therefore, the user can obtain an abnormality degree of a group which is similar to that obtained at the time of analyzing the time-series data by manual calculation.

According to the third, ninth, or fifteenth aspect of the present invention, the normalization is performed so that the maximum value and the minimum value of the median values included in the median-value time-series data are transformed to 1 and 0. Therefore, it is possible to calculate a more preferable abnormality degree of the group than in the case of performing the conventional normalization.

According to the fourth or tenth aspect of the present invention, an abnormality degree of the time-series data is calculated based on the normalized time-series data, and a time-series data ranking based on the abnormality degrees of the time-series data is displayed. Therefore, the user can recognize abnormal time-series data easily.

According to the fifth or eleventh aspect of the present invention, a sum of differences in pieces of data of the same time between the time-series data and the median-value time-series data is calculated. Therefore, it is possible to obtain a preferable abnormality degree of the time-series data.

According to the sixth or twelfth aspect of the present invention, link information for displaying a screen that includes the time-series data ranking is included in the screen that includes the group ranking. Therefore, it is possible to display the screen that includes the time-series data ranking by simple operation.

These and other objects, features, modes, and effects of the present invention will become more apparent from the following detailed description with reference to the attached drawings.

BRIEF DESCRIPTION OF THE DRAWINGS

FIG. 4 is a view illustrating a screen for inputting analysis period information in the time-series data processing device according to the present embodiment;

DETAILED DESCRIPTION OF THE INVENTION

Hereinafter, a time-series data processing method, a time-series data processing program, and a time-series data processing device according to an embodiment of the present invention will be described with reference to the drawings. The time-series data processing method according to the present embodiment is typically performed using a computer. The time-series data processing program according to the present embodiment is a program for causing the computer to execute the time-series data processing method. The time-series data processing device according to the present embodiment is typically configured using the computer. The computer that executes the time-series data processing program functions as the time-series data processing device.

Figure 1:
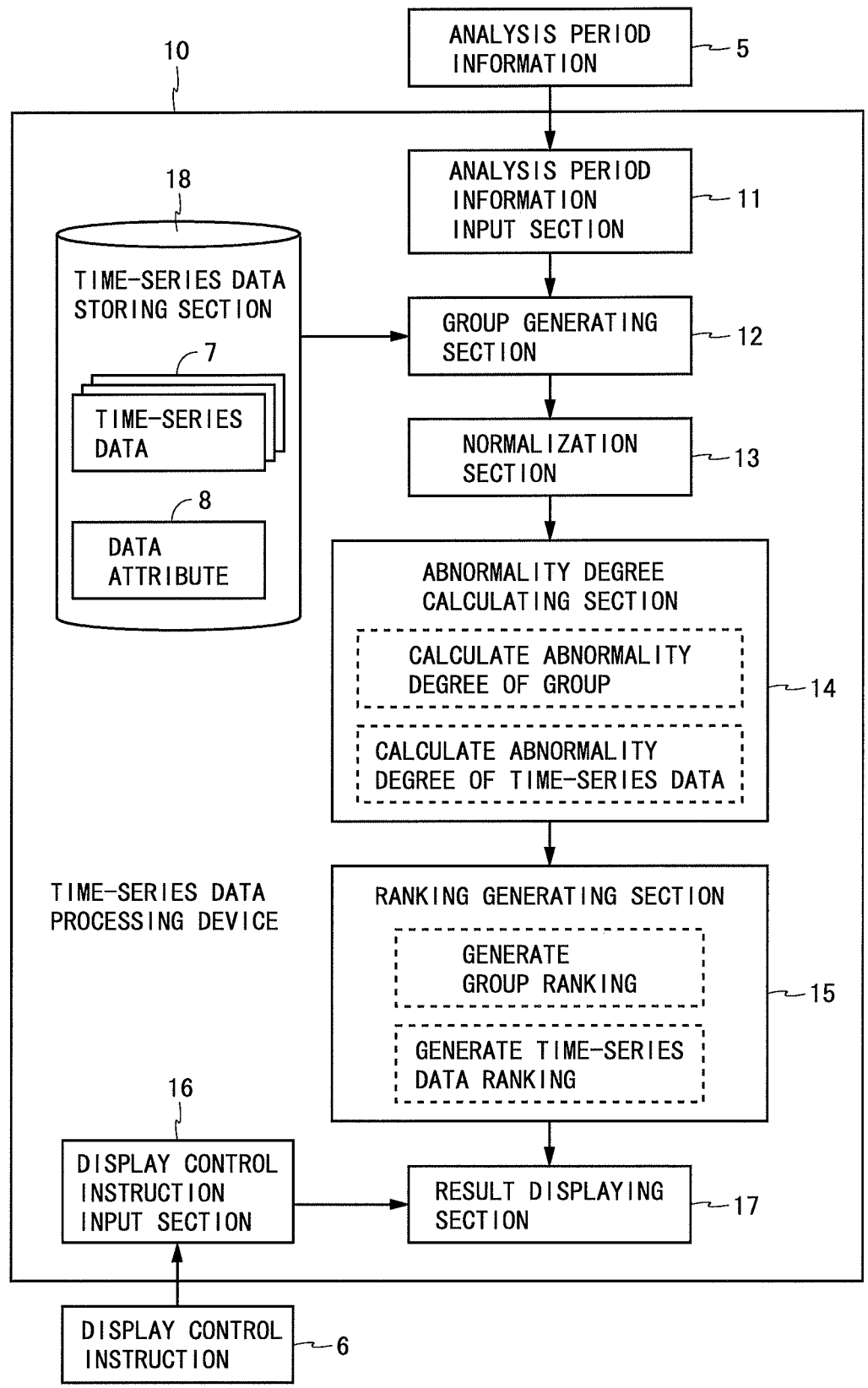
FIG. 1 is a block diagram illustrating a configuration of a time-series data processing device according to an embodiment of the present invention.

FIG. 1 is a block diagram illustrating a configuration of a time-series data processing device according to an embodiment of the present invention. A time-series data processing device 10 illustrated in FIG. 1 includes an analysis period information input section 11, a group generating section 12, a normalization section 13, an abnormality degree calculating section 14, a ranking generating section 15, a display control instruction input section 16, a result displaying section 17, and a time-series data storing section 18. The time-series data processing device 10 processes a plurality of pieces of time-series data, and displays the time-series data in such a manner as to facilitate a user to analyze the data.

The time-series data storing section 18 stores a plurality of pieces of time-series data 7 and a data attribute 8. The time-series data 7 is data obtained by measuring, by using a sensor or the like, a physical quantity (e.g., length, angle, time, velocity, force, pressure, voltage, current, temperature, flow rate, etc.) which indicates an operating state of an apparatus or a device provided outside the time-series data processing device 10, and sequentially arranging measured results in time-series order. The data attribute 8 shows an attribute of each time-series data 7. The data attribute 8 shows, for example, a type and a number of the apparatus or the device, the kind of the physical quantity, a start time, an end time, a data measurement interval, and the like, for each time-series data 7.

The plurality of pieces of time-series data 7 stored in the time-series data storing section 18 include time-series data obtained by measuring the same physical quantity, time-series data obtained by measuring different physical quantities, time-series data including the same number of pieces of data, and time-series data including different numbers of pieces of data. Particularly, the plurality of pieces of time-series data 7 stored in the time-series data storing section 18 include a plurality of pieces of time-series data which have been obtained by measuring the same physical quantity in the same condition, and change in a similar manner (or, more precisely, expected to change in a similar manner). The time-series data processing device 10 collects and groups such time-series data, and performs a process on the groups of the time-series data.

For example, a case is considered in which the time-series data processing device 10 processes time-series data obtained in a semiconductor manufacturing device. The semiconductor manufacturing device includes a plurality of processing units for performing predetermined processing on semiconductor substrates, and each of the processing units measures operation data indicating an operating state, at predetermined time intervals (e.g., interval of 100 ms). By arranging the measured operation data in time-series order, time-series data is obtained. When the plurality of processing units perform the same processing on the semiconductor substrates in the same condition, a plurality of pieces of time-series data obtained by the plurality of processing units change in a similar manner.

Figure 2:
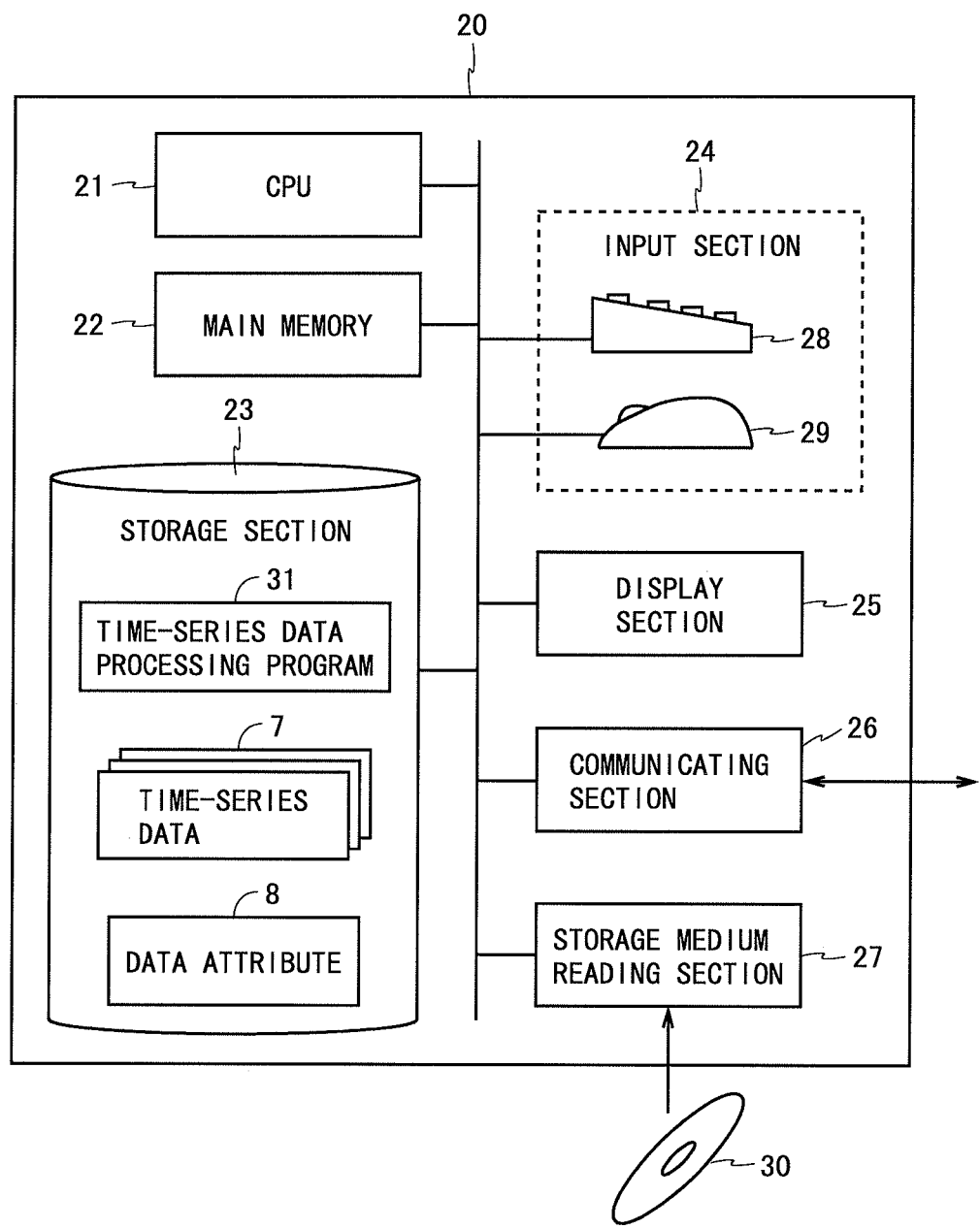
FIG. 2 is a block diagram illustrating a configuration of a computer that functions as the time-series data processing device according to the present embodiment.

FIG. 2 is a block diagram illustrating a configuration of a computer that functions as the time-series data processing device 10. A computer 20 illustrated in FIG. 2 includes a CPU 21, a main memory 22, a storage section 23, an input section 24, a display section 25, a communicating section 26, and a storage medium reading section 27. As the main memory 22, for example, a DRAM is used. As the storage section 23, for example, a hard disk or a solid-state drive is used. The input section 24 includes a keyboard 28 and a mouse 29, for example. As the display section 25, for example, a liquid crystal display is used. The communicating section 26 is an interface circuit for wired communication or wireless communication. The storage medium reading section 27 is an interface circuit of a storage medium 30 having stored thereon a program and the like. As the storage medium 30, for example, a non-transient recording medium such as a CD-ROM is used. Note that the configuration of the computer 20 described above is just an example, and the time-series data processing device 10 can be configured using an arbitrary computer.

Hereinafter, a description will be given of a case where the computer 20 functions as the time-series data processing device 10. In this case, the storage section 23 stores a time-series data processing program 31, the plurality of pieces of time-series data 7 to be processing targets of the time-series data processing program 31, and the data attribute 8 showing an attribute of each time-series data 7. For example, the time-series data processing program 31 may be received from a server or another computer by using the communicating section 26, or may be read from the storage medium 30 by using the storage medium reading section 27. The time-series data 7 and the data attribute 8 may be received from the apparatus, the device, or another computer by using the communicating section 26, may be read from the storage medium 30 by using the storage medium reading section 27, or may be inputted by the user by using the input section 24.

When the time-series data processing program 31 is to be executed, the time-series data processing program 31, the time-series data 7, and the data attribute 8 are copied and transferred to the main memory 22. The CPU 21 executes the time-series data processing program 31 stored in the main memory 22 by using the main memory 22 as a work memory, to thereby process the plurality of pieces of time-series data 7 stored in the main memory 22. At this time, the computer 20 functions as the time-series data processing device 10.

A brief summary of operation of the time-series data processing device 10 is as follows. The analysis period information input section 11 receives analysis period information 5 inputted by the user. The group generating section 12 generates a plurality of groups each made up of a plurality of pieces of time-series data that change in a similar manner (more precisely, expected to change in a similar manner) based on the plurality of pieces of time-series data 7 stored in the time-series data storing section 18, with reference to the analysis period information 5 and the data attribute 8 stored in the time-series data storing section 18. The normalization section 13 normalizes, for each group, the time-series data in the group by the same transformation. Based on the normalized time-series data, the abnormality degree calculating section 14 calculates, for each group, an abnormality degree of the group and an abnormality degree of the time-series data in the group. The ranking generating section 15 generates a group ranking based on the abnormality degrees of the groups, and also generates, for each group, a time-series data ranking based on the abnormality degrees of the time-series data in the group. The display control instruction input section 16 receives a display control instruction 6 inputted by the user. Following the display control instruction 6, the result displaying section 17 displays a screen that includes the group ranking and a screen that includes the time-series data ranking.

Figure 3:
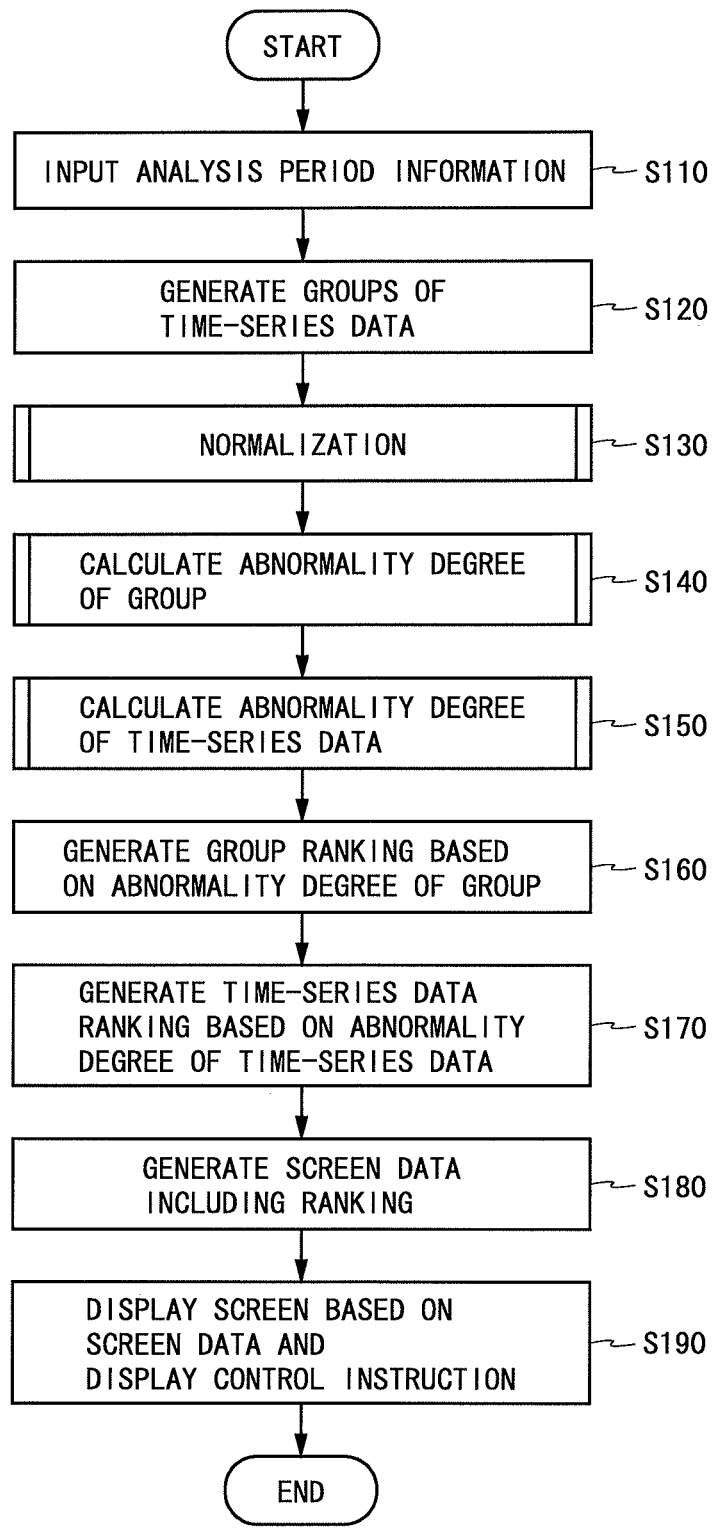
FIG. 3 is a flowchart illustrating operation of the time-series data processing device according to the present embodiment.

FIG. 3 is a flowchart illustrating operation of the time-series data processing device 10. The processing illustrated in FIG. 3 is performed by the CPU 21 executing the time-series data processing program 31 by using the main memory 22.

First, the CPU 21 receives the analysis period information 5 inputted by the user (step S110). The analysis period information 5 specifies processing-target time-series data, a processing-target period, and the like for the plurality of pieces of time-series data 7 stored in the time-series data storing section 18. When the CPU 21 performs step S110, the display section 25 displays a screen 41 (screen for inputting analysis period information) illustrated in FIG. 4. The user inputs the analysis period information 5 by operating the input section 24 while looking at the screen 41 illustrated in FIG. 4.

Next, the CPU 21 generates groups of the time-series data (step S120). More specifically, in step S120, the CPU 21 groups the time-series data 7 stored in the time-series data storing section 18 with reference to the analysis period information 5 inputted in step S110 and the data attribute 8 stored in the time-series data storing section 18. Each group includes the plurality of pieces of time-series data which are obtained by measuring the same physical quantity in the same condition and change in a similar manner. Hereinafter, the groups generated in step S120 are simply referred to as "groups".

The CPU 21 generates a plurality of groups in step S120. In each group, the kind and the number of data included in the time-series data are the same. Between the groups, the kind and the number of data included in the time-series data may be different. Further, between the groups, the number of time-series data in each group may be different. For example, one group may include ten pieces of time-series data each including 300 flow rate values, and another group may include eight pieces of time-series data each including 400 flow rate values.

Figure 5:
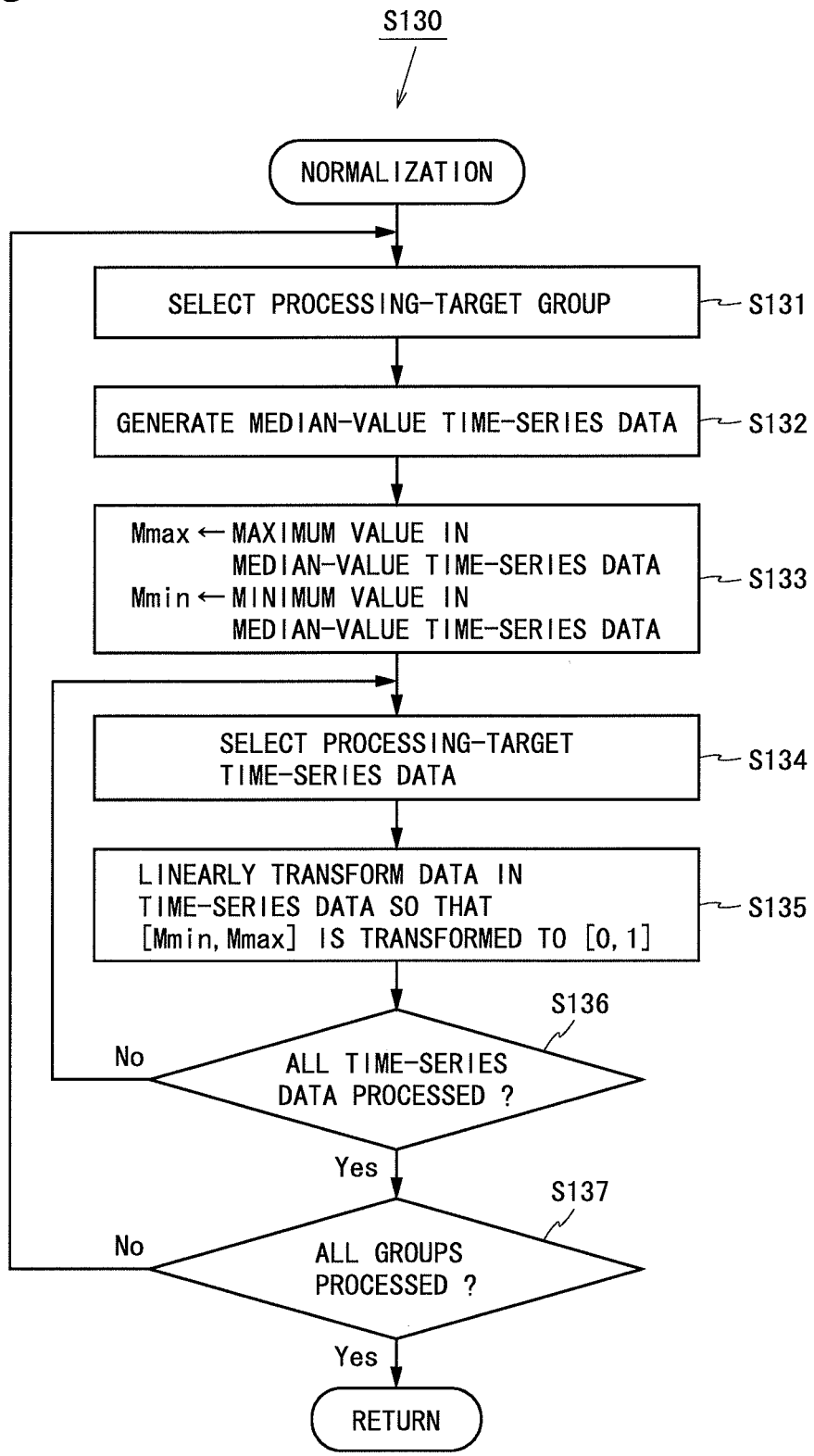
FIG. 5 is a flowchart illustrating details of step S130 illustrated in FIG. 3.

Next, the CPU 21 normalizes the time-series data in the group, for each of the groups generated in step S120 (step S130). FIG. 5 is a flowchart illustrating details of step S130. In step S130, first, the CPU 21 selects a processing-target group out of unprocessed groups (step S131). Next, the CPU 21 generates median-value time-series data for the group selected in step S131 (step S132). Herein, the median-value time-series data is obtained by arranging median values of pieces of data of the same time, which are included in the time-series data in the group, in time-series order.

For example, a case is considered in which the processing-target group includes m pieces of time-series data DQ1 to DQm shown below. Note that n represents the number of data included in each time-series data, Dij (i is an integer of 1 or more and m or less, and j is an integer of 1 or more and n or less) represents j-th data included in the time-series data DQi.

$DQ1=(D11, D12, \ldots, D1n)$ $DQ2=(D21, D22, \ldots, D2n)$

. . .

$DQm=(Dm1, Dm2, \ldots, Dmn)$

In this case, the CPU 21 obtains a median value M1 of m data D11, D21, . . . , Dm1, a median value M2 of m data D21, D22, . . . , and Dm2, and a median value Mn of m data D1n, D2n, . . . , Dmn, and arranges n median values M1 to Mn in time-series order, to generate median-value time-series data $MQ=(M1, M2, \ldots, Mn)$.

Next, the CPU 21 obtains the maximum value Mmax and the minimum value Mmin of the median values included in the median-value time-series data generated in step S132 (step S133). In the above example, the CPU 21 obtains the maximum value Mmax and the minimum value Mmin of the n median values M1 to Mn. Next, the CPU 21 selects a processing-target time-series data out of unprocessed time-series data in the group selected in step S131 (step S134).

Next, the CPU 21 normalizes the time-series data selected in step S134 so that a range [Mmin, Mmax] is transformed to a range [0, 1] (step S135). Specifically, the CPU 21 performs calculation shown in the following equation (1) on the j-th data Dij included in the time-series data DQi, to obtain normalized data Eij.

$$Eij=(Dij-M\text{min})/(M\text{max}-M\text{min}) \quad (1)$$

As thus described, in step S135, the CPU 21 linearly transforms data included in the time-series data in the group so that the maximum value Mmax and the minimum value Mmin of the median values included in the median-value time-series data are transformed to 1 and 0, respectively.

Next, the CPU 21 determines whether or not all of the time-series data in the group selected in step S131 have been processed (step S136). In the case of No in step S136, the CPU 21 moves to step S134, and in the case of Yes, the CPU 21 moves to step S137. In the latter case, the CPU 21 determines whether or not all the groups generated in step S120 have been processed (step S137). In the case of No in step S137, the CPU 21 moves to step S131, and in the case of Yes, the CPU 21 completes step S130 and moves to step S140.

Figure 6:
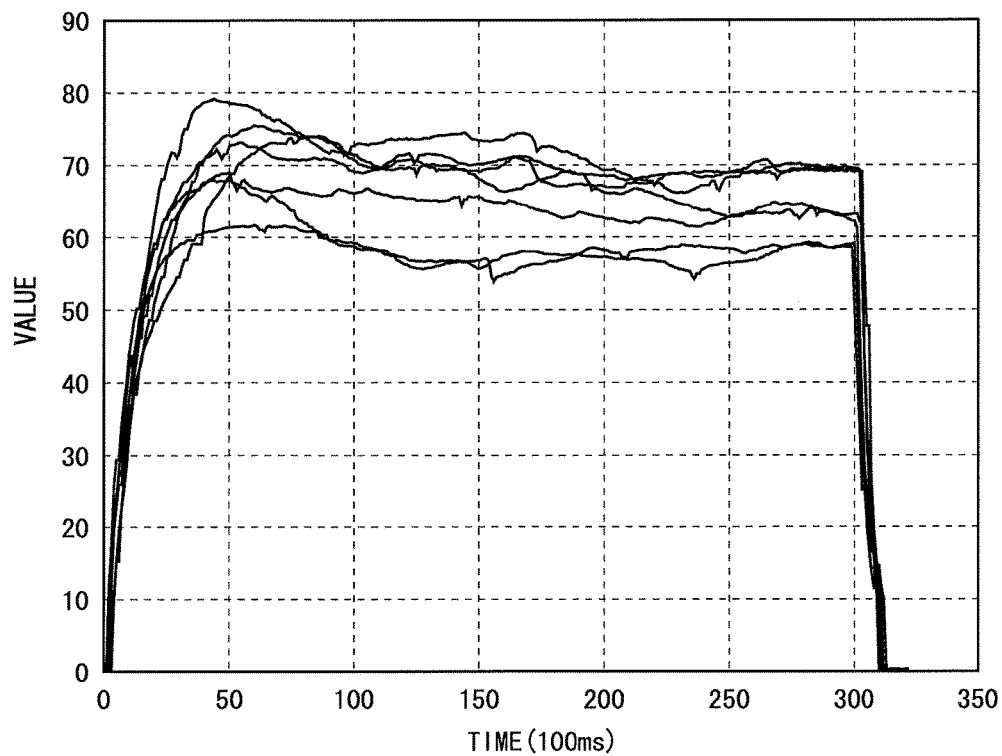
FIG. 6 is a diagram graphically illustrating time-series data in a group.
Figure 7:
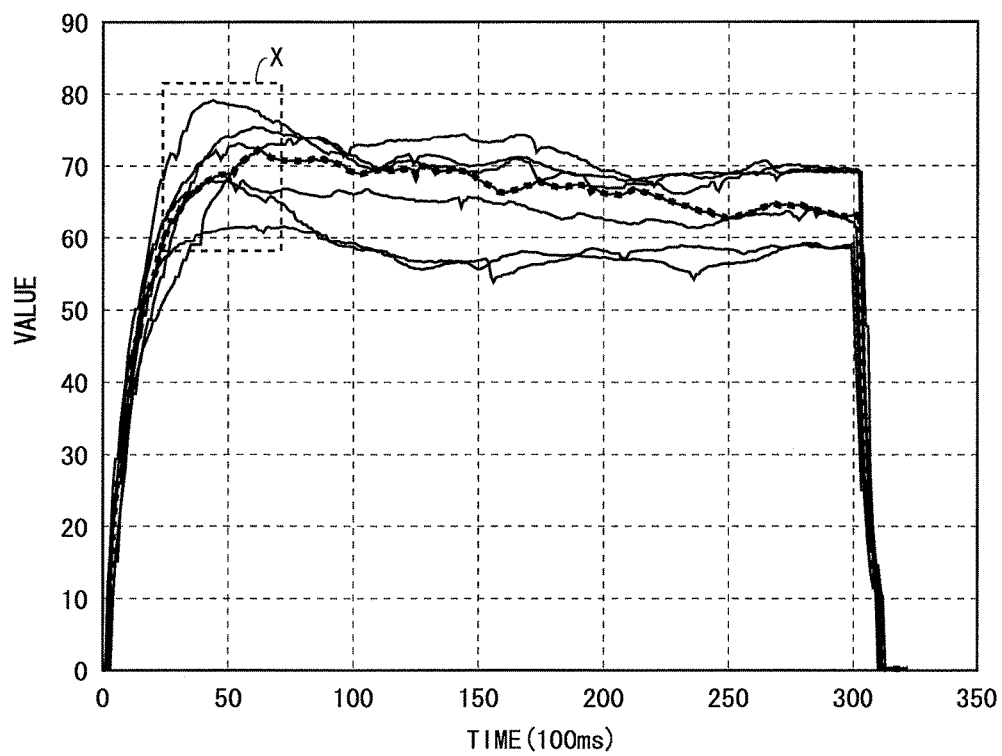
FIG. 7 is a diagram graphically illustrating median-value time-series data in the group illustrated in FIG. 6.
Figure 8:
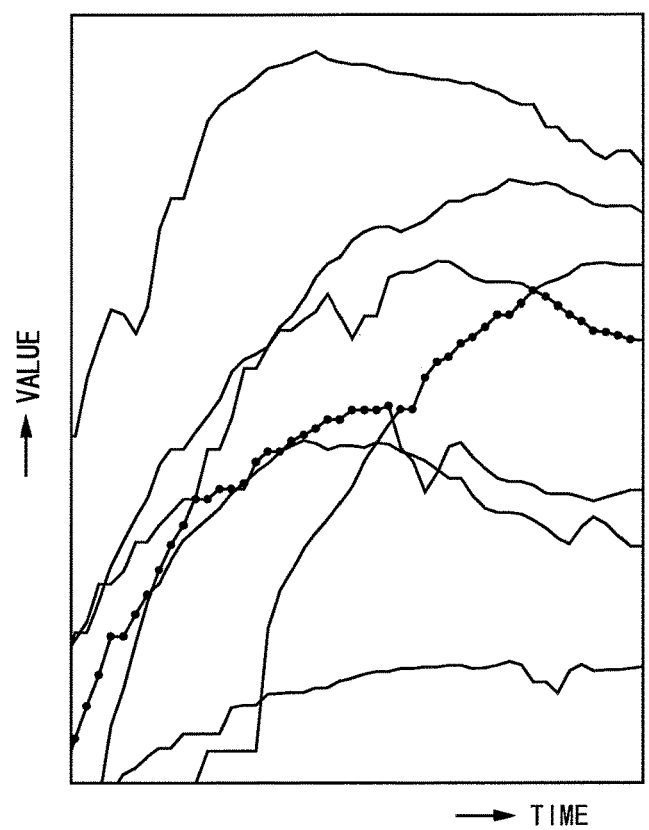
FIG. 8 is an enlarged view of an X-section of FIG. 7.
Figure 9:
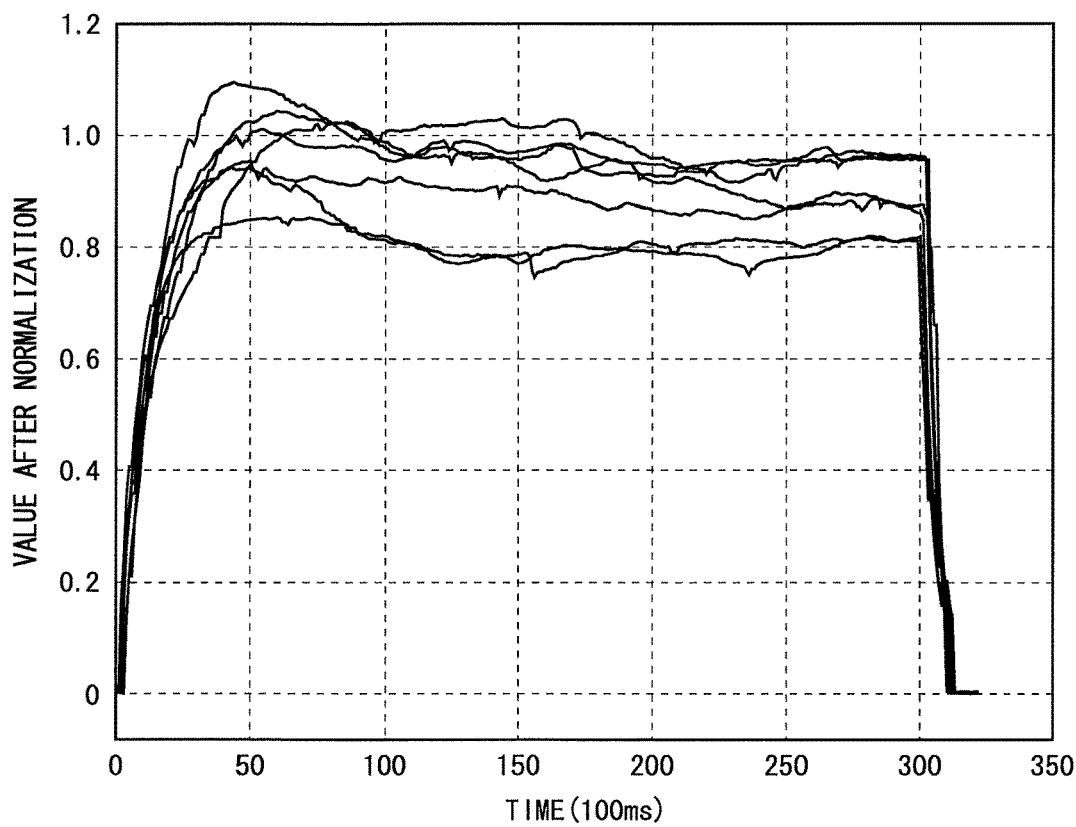
FIG. 9 is a diagram illustrating a result of performing normalization according to the present embodiment on the group illustrated in FIG. 6.

An example of normalization will be described with reference to FIGS. 6 to 9. FIG. 6 is a diagram graphically illustrating time-series data in a group. The group illustrated in FIG. 6 includes seven pieces of time-series data. In this case, in step S132, the CPU 21 generates median-value time-series data indicated by a thick broken line in FIG. 7. FIG. 8 is an enlarged view of an X-section of FIG. 7. In FIG. 8, median values included in the median-value time-series data are indicated by black points. In steps S133 to S136, the CPU 21 normalizes each of the seven pieces of time-series data illustrated in FIG. 6 so that the maximum value and the minimum value of the median values included in the median-value time-series data are transformed to 1 and 0, respectively. FIG. 9 is a diagram graphically illustrating normalized time-series data. Although FIGS. 6 and 9 show different values on the vertical axes, their graphical shapes are the same.

Figure 10:
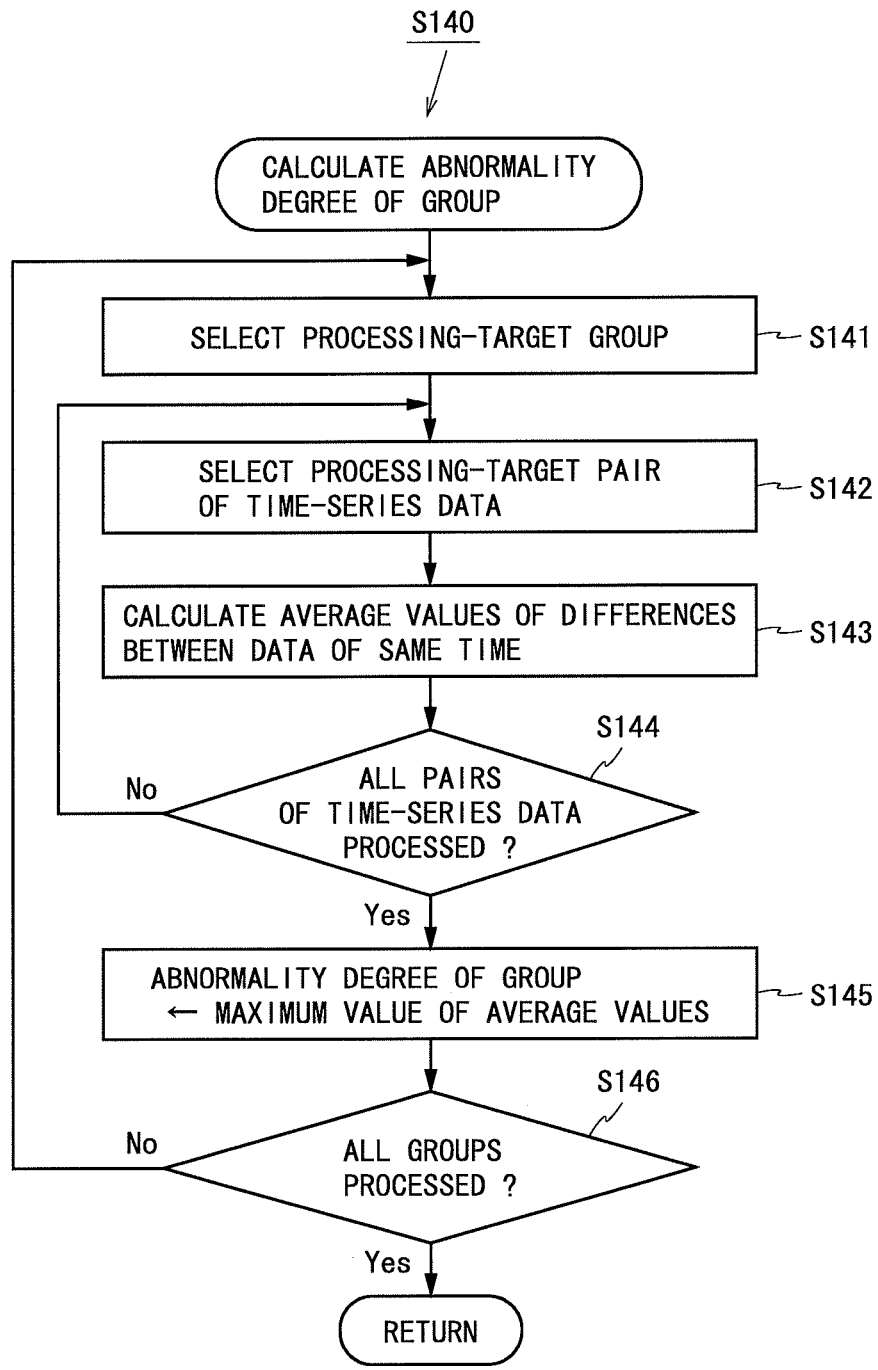
FIG. 10 is a flowchart illustrating details of step S140 illustrated in FIG. 3.

Next, the CPU 21 calculates an abnormality degree of the group based on the normalized time-series data, for each of the groups generated in step S120 (step S140). FIG. 10 is a flowchart illustrating details of step S140. In step S140, first, the CPU 21 selects a processing-target group out of unprocessed groups (step S141).

When the processing-target group includes m pieces of time-series data, the number of combinations of two pieces of time-series data (hereinafter referred to as "a pair of time-series data") is $\{m \times (m-1)/2\}$ in total. The CPU 21 selects a processing-target pair of time-series data out of the unprocessed pairs of time-series data in the group selected in step S141 (step S142). Next, the CPU 21 calculates an average value of differences between pieces of data of the same time for the pair of time-series data selected in step S142 (step S143). Note that the difference between pieces of data of the same time can also be said to be the Euclidean distance (or linear distance) between pieces of data of the same time.

For example, a case is considered in which a processing-target pair of time-series data includes two pieces of normalized time-series data EQi, EQk (i and k are integers of 1 or more and m or less). However, Eij (j is an integer of 1 or more and n or less) represents j-th data included in the normalized time-series data EQi.

$$EQi=(Ei1, Ei2, \ldots, Ein)$$

$$EQk=(Ek1, Ek2, \ldots, Ekn)$$

In this case, the CPU 21 calculates an average value AVE_DIF(EQi,EQk) of the differences between pieces of data of the same time in accordance with the following equation (2).

$$\text{AVE\_DIF}(EQi, EQk) = (|Ei1-Ek1|+|Ei2-Ek2|+ \ldots +|Ein-Ekn|)/n \quad (2)$$

Next, the CPU 21 determines whether or not all the pairs of time-series data have been processed for the group selected in step S141 (step S144). In the case of No in step S144, the CPU 21 moves to step S142, and in the case of Yes, the CPU 21 moves to step S145. In the latter case, the CPU 21 obtains the maximum value of the average values obtained in step S143, and takes the obtained value as an abnormality degree of the group (step S145). Next, the CPU 21 determines whether or not all the groups generated in step S120 have been processed (step S146). In the case of No in step S146, the CPU 21 moves to step S141, and in the case of Yes, the CPU 21 completes step S140 and moves to step S150.

As thus described, the abnormality degree of the group is the maximum value of average values which are obtained when an average value of the differences between pieces of data of the same time is obtained for every pair of the time-series data. The abnormality degree of the group is large when two pieces of time-series data with low similarity are included in the group.

Figure 11:
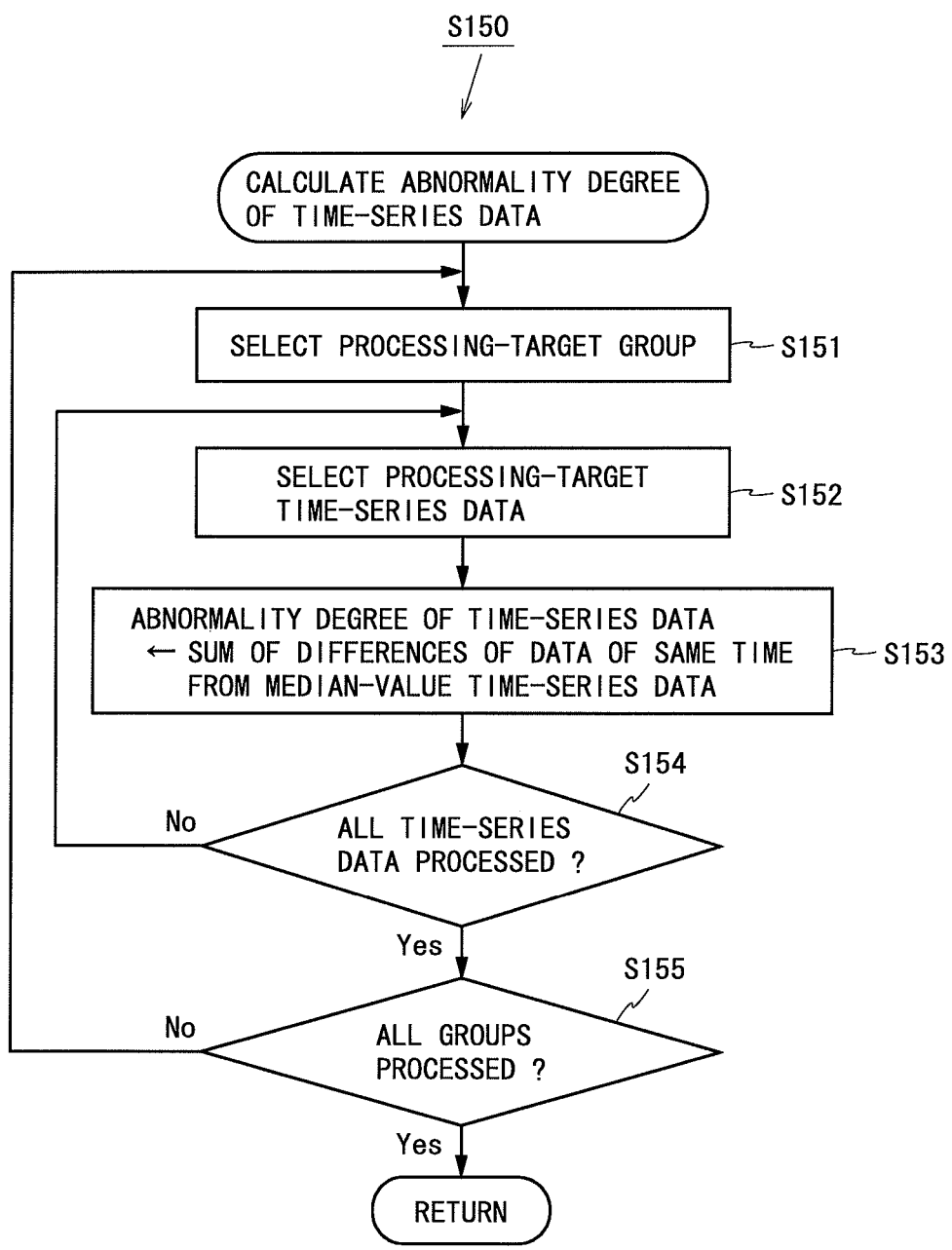
FIG. 11 is a flowchart illustrating details of step S150 illustrated in FIG. 3.

Next, the CPU 21 calculates an abnormality degree of the time-series data based on the normalized time-series data, for each time-series data in each group generated in step S120 (step S150). FIG. 11 is a flowchart illustrating details of step S150. In step S150, first, the CPU 21 selects a processing-target group out of unprocessed groups (step S151). Next, the CPU 21 selects a processing-target time-series data out of unprocessed time-series data in the group selected in step S151 (step S152).

Next, the CPU 21 calculates an abnormality degree of the time-series data selected in step S152 (step S153). More specifically, as the abnormality degree of the time-series data, the CPU 21 obtains a sum of differences in pieces of data of the same time from the median-value time-series data generated in step S132. For example, a case is considered in which the processing-target normalized time-series data EQi and the median-value time-series data MQ are as follows.

$$EQi=(Ei1, Ei2, \ldots, Ein)$$

$$MQ=(M1, M2, \ldots, Mn)$$

In this case, the CPU 21 calculates a sum SUM_DIF (EQi, MQ) of differences in pieces of data of the same time in accordance with the following equation (3), and takes the calculated value as the abnormality degree of the original time-series data DQi.

$$\text{SUM\_DIF}(EQi, MQ) = |Ei1-M1|+|Ei2-M2|+ \ldots +|Ein-Mn| \quad (3)$$

Next, the CPU 21 determines whether or not all the time-series data in the group selected in step S151 have been processed (step S154). In the case of No in step S154, the CPU 21 moves to step S152, and in the case of Yes, the CPU 21 moves to step S155. In the latter case, the CPU 21 determines whether or not all the groups generated in step S120 have been processed (step S155). In the case of No in step S155, the CPU 21 moves to step S151, and in the case of Yes, the CPU 21 completes step S150 and moves to step S160.

As thus described, the CPU 21 calculates the abnormality degree of each of the groups in step S140, and calculates the abnormality degree of each time-series data in each of the groups in step S150. Next, the CPU 21 generates a group ranking based on the abnormality degree of each of the groups calculated in step S140 (step S160). The group ranking includes a result of sorting the groups in descending order of abnormality degree. Next, the CPU 21 generates, for each of the groups generated in step S120, a time-series data ranking based on the abnormality degree of the time-series data calculated in step S150 (step S170). The time-series data ranking includes a result of sorting the time-series data in one group in descending order of abnormality degree.

Next, the CPU 21 generates screen data including the ranking (step S180). More specifically, the CPU 21 generates first screen data including the group ranking obtained in step S160, and second screen data including the time-series data ranking obtained in step S170. The second screen data is generated for each of the groups generated in step S120. The first screen data and the second screen data are generated by using a page description language such as HTML (Hyper Text Markup Language). In this case, the first screen data includes link information for accessing the second screen data.

Next, the CPU 21 displays the screen on the display section 25 based on the screen data generated in step S180 and the display control instruction 6 (step S190). More specifically, the CPU 21 receives the display control instruction 6 inputted by the user. The display control instruction 6 specifies whether to display the screen that includes the group ranking or the screen that includes the time-series data ranking. In the former case, the CPU 21 displays the screen that includes the group ranking on the display section 25 based on the first screen data generated in step S180. In the latter case, the display control instruction 6 also specifies the time-series data ranking of which group is included in the screen that is to be displayed. Following the display control instruction 6, the CPU 21 displays on the display section 25 the screen that includes the time-series data ranking in the group selected by the display control instruction 6 based on any of the second screen data generated in step S180.

Figure 12:
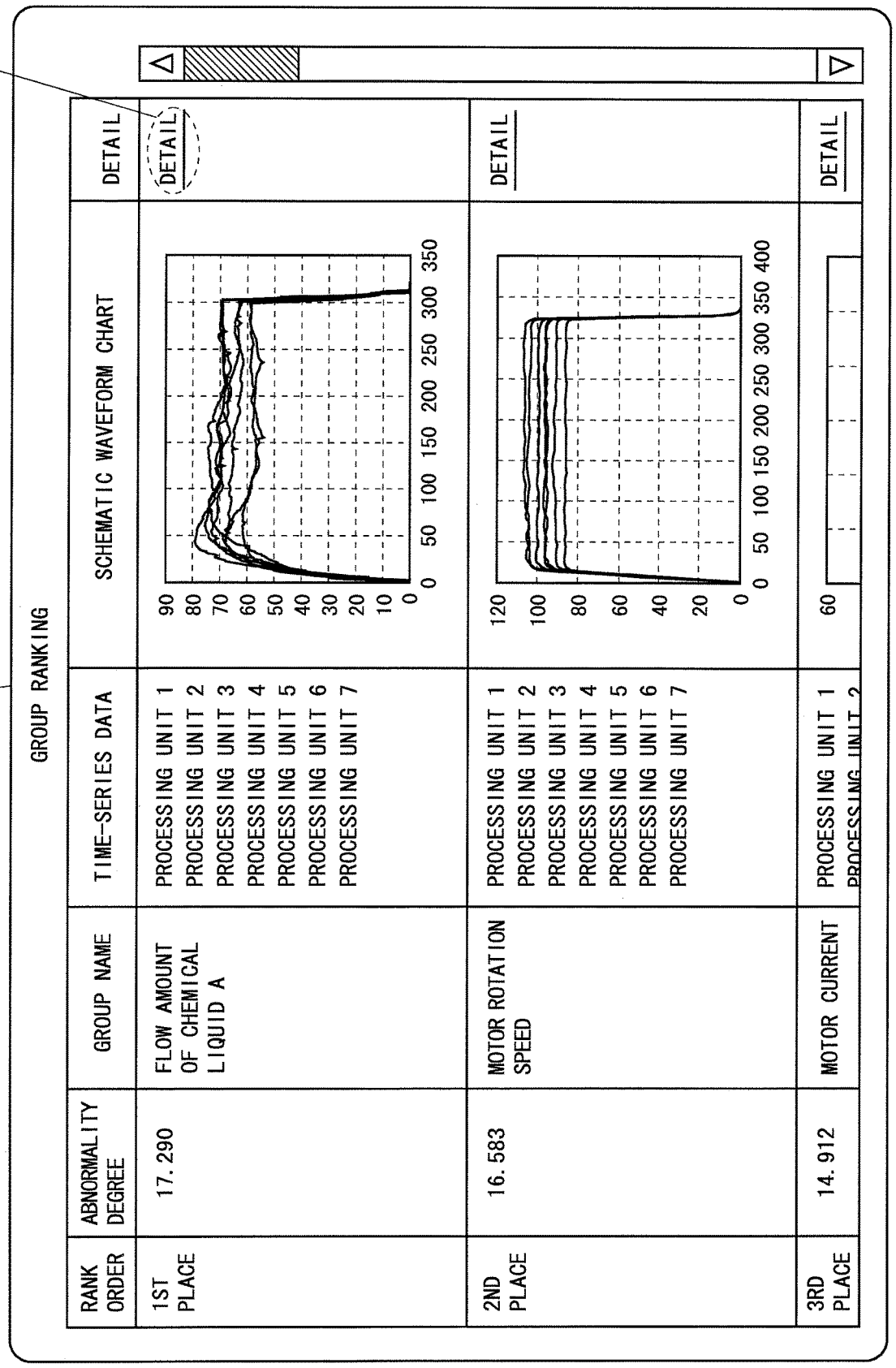
FIG. 12 is a view illustrating a screen that includes a group ranking in the time-series data processing device according to the present embodiment.
Figure 13:
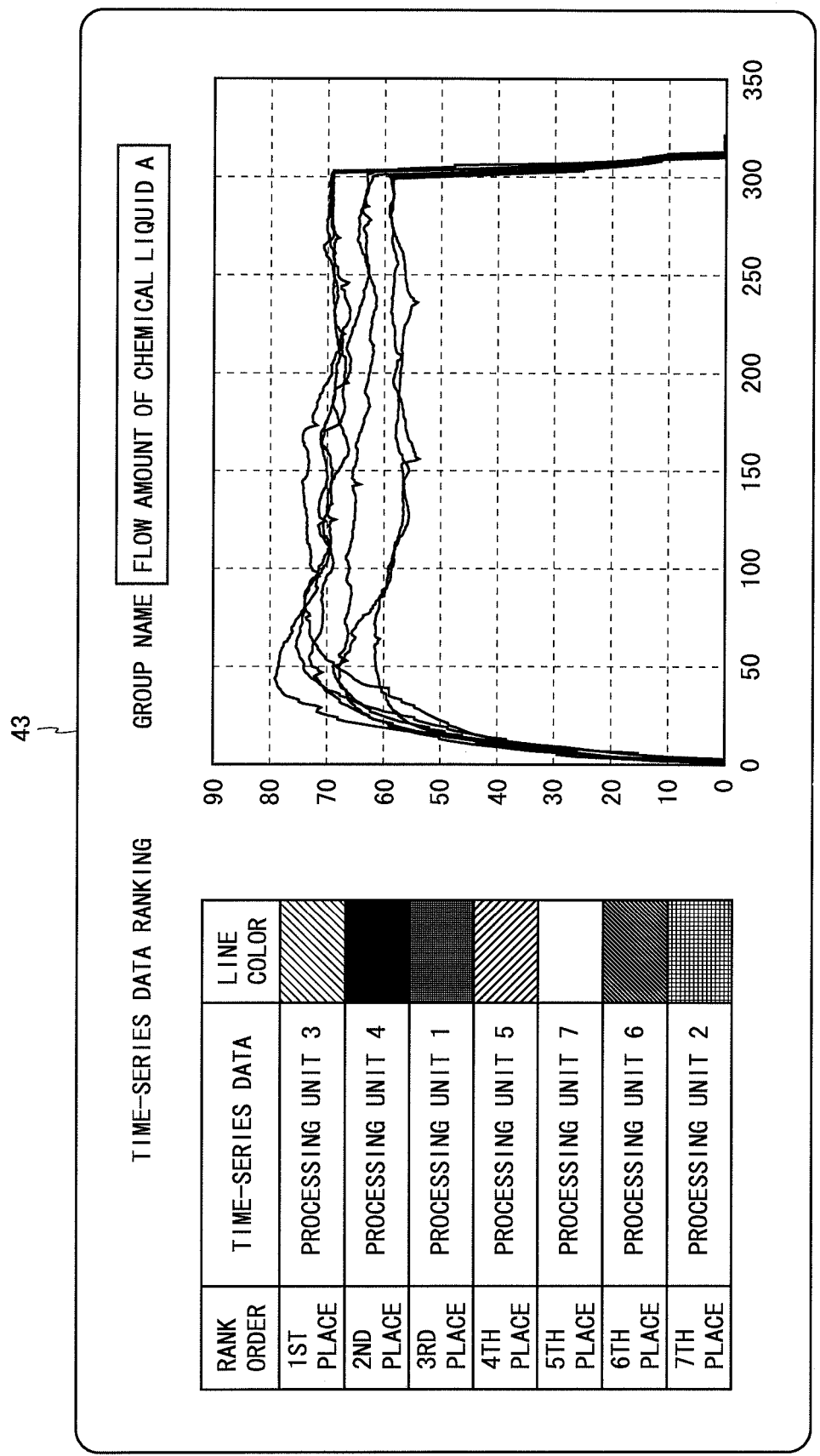
FIG. 13 is a view illustrating a screen that includes a time-series data ranking in the time-series data processing device according to the present embodiment.

FIG. 12 is a view illustrating a screen that includes a group ranking in the time-series data processing device 10. FIG. 13 is a view illustrating a screen that includes a time-series data ranking in the time-series data processing device 10. When the CPU 21 performs step S190, the display section 25 first displays a screen 42 illustrated in FIG. 12. The screen 42 includes link information 44 for displaying a screen 43 illustrated in FIG. 13. When the user operates the input section 24 and clicks the link information 44 while the display section 25 is displaying the screen 42, the display section 25 displays the screen 43. As thus described, by including link information for displaying the screen that includes the time-series data ranking in the screen that includes the group ranking, the screen that includes the time-series data ranking can be displayed by simple operation.

The configuration element of the computer 20 illustrated in FIG. 2 and the steps illustrated in FIG. 3 correspond to the configuration element of the time-series data processing device 10 illustrated in FIG. 1 as follows. The input section 24 and the CPU 21 that performs step S110 function as the analysis period information input section 11. The CPU 21 that performs step S120 functions as the group generating section 12. The CPU 21 that performs step S130 functions as the normalization section 13. The CPU 21 that performs steps S140 and S150 functions as the abnormality degree calculating section 14. The CPU 21 that performs steps S160 and S170 functions as the ranking generating section 15. The input section 24 and the CPU 21 that performs processing concerning the display control instruction in step S190 function as the display control instruction input section 16. The display section 25 and the CPU 21 that performs the processing concerning the display in steps S180 and S190 function as the result displaying section 17.

As thus described, the time-series data processing device 10 groups time-series data that change in a similar manner, calculates an abnormality degree of the group based on the normalized time-series data, and displays on the screen a group ranking based on the abnormality degree of the group. Thus, according to the time-series data processing device 10, the user can easily recognize a group that includes abnormal time-series data. Further, by preferentially analyzing the group that includes abnormal time-series data, the user can analyze time-series data easily.

Moreover, in step S130, the CPU 21 performs normalization so that the maximum value and the minimum value of the median values included in the median-value time-series data are transformed to 1 and 0, respectively. Hereinafter, the effect of the normalization according to the present embodiment will be described. As a method for normalizing a plurality of pieces of time-series data, there is considered a method of obtaining the maximum value Nmax and the minimum value Nmin of data included in all of time-series data to perform normalization so as to transform the maximum value Nmax to 1 and the minimum value Nmin to 0 (hereinafter referred to as "conventional normalization"). In the conventional normalization, a result Fij of normalizing the data Dij is given by the following equation (4).

$$Fij=(Dij-N\text{min})/(N\text{max}-N\text{min}) \quad (4)$$

Figure 14:
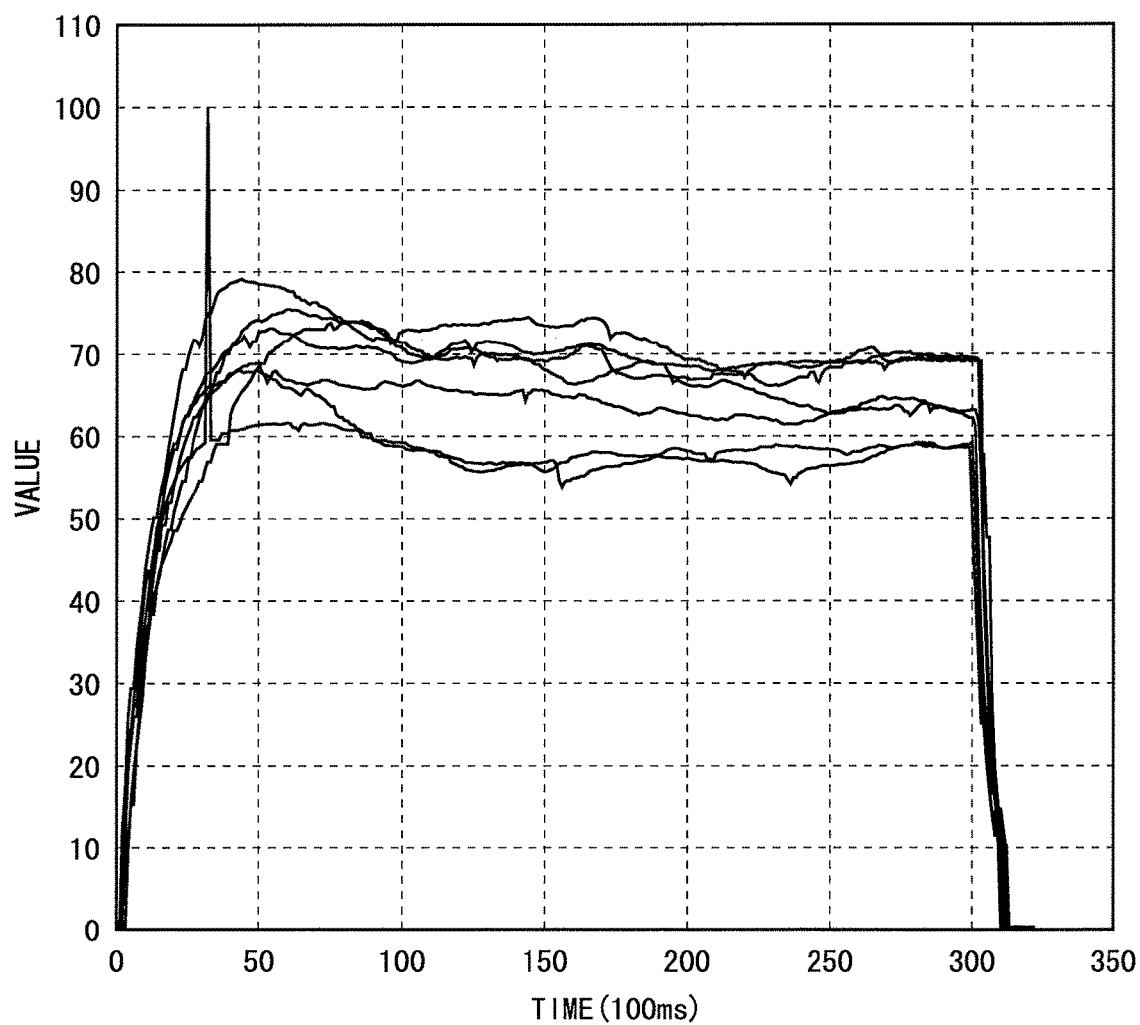
FIG. 14 is a diagram graphically illustrating time-series data in another group.
Figure 15:
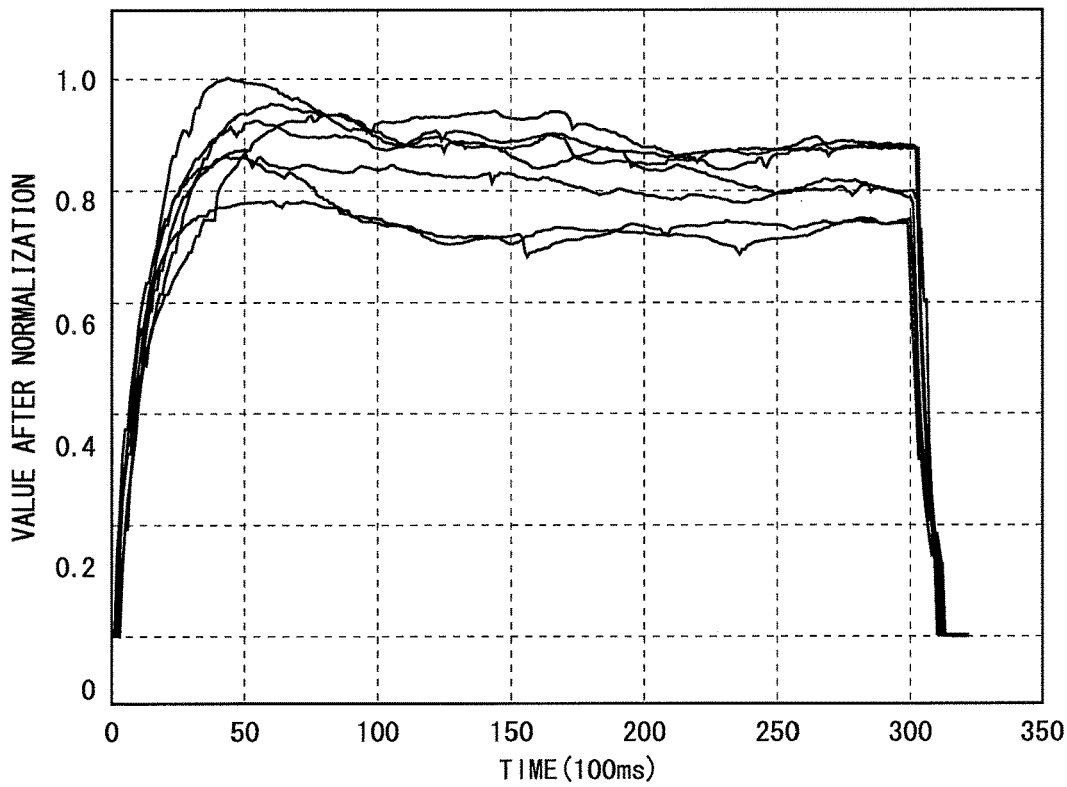
FIG. 15 is a diagram illustrating a result of performing conventional normalization on the group illustrated in FIG. 6.
Figure 16:
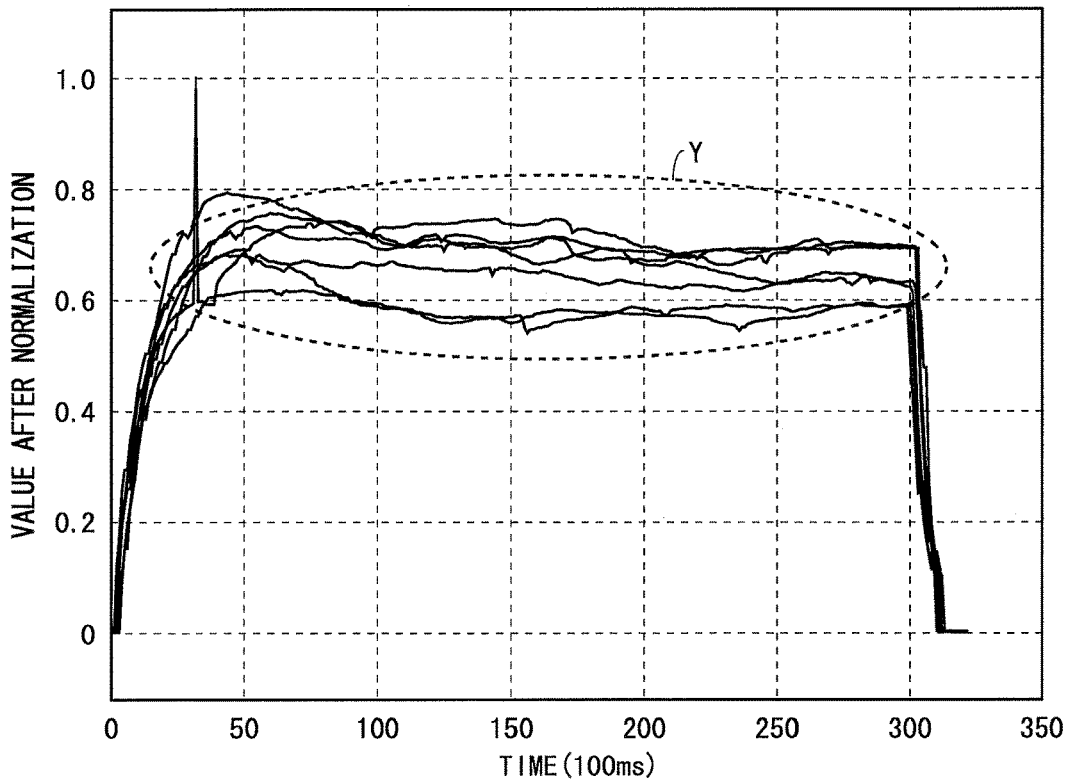
FIG. 16 is a diagram illustrating a result of performing conventional normalization on the group illustrated in FIG. 14.

Hereinafter, a group illustrated in FIG. 6 is referred to as a first group, and a group illustrated in FIG. 14 is referred to as a second group. The second group is obtained by adding noise to one time-series data in the first group. FIGS. 15 and 16 are diagrams illustrating results of performing conventional normalization on the first and second groups. In this case, an abnormality degree of the first group is 15.756, and an abnormality degree of the second group is 12.557. Since the second group includes the time-series data added with the noise, the abnormality degree of the second group should be originally larger than the abnormality degree of the first group. However, in the conventional normalization, the maximum value Nmax and the minimum value Nmin including the noise are obtained, and the normalized time-series data is thus affected by the noise. Hence in the second group, the maximum value Nmax becomes large due to the influence of the noise, and a difference between data becomes small in a portion other than the noise (Y-section in FIG. 16). As a result, there occurs an undesirable state where the abnormality degree of the second group is smaller than the abnormality degree of the first group.

Figure 17:
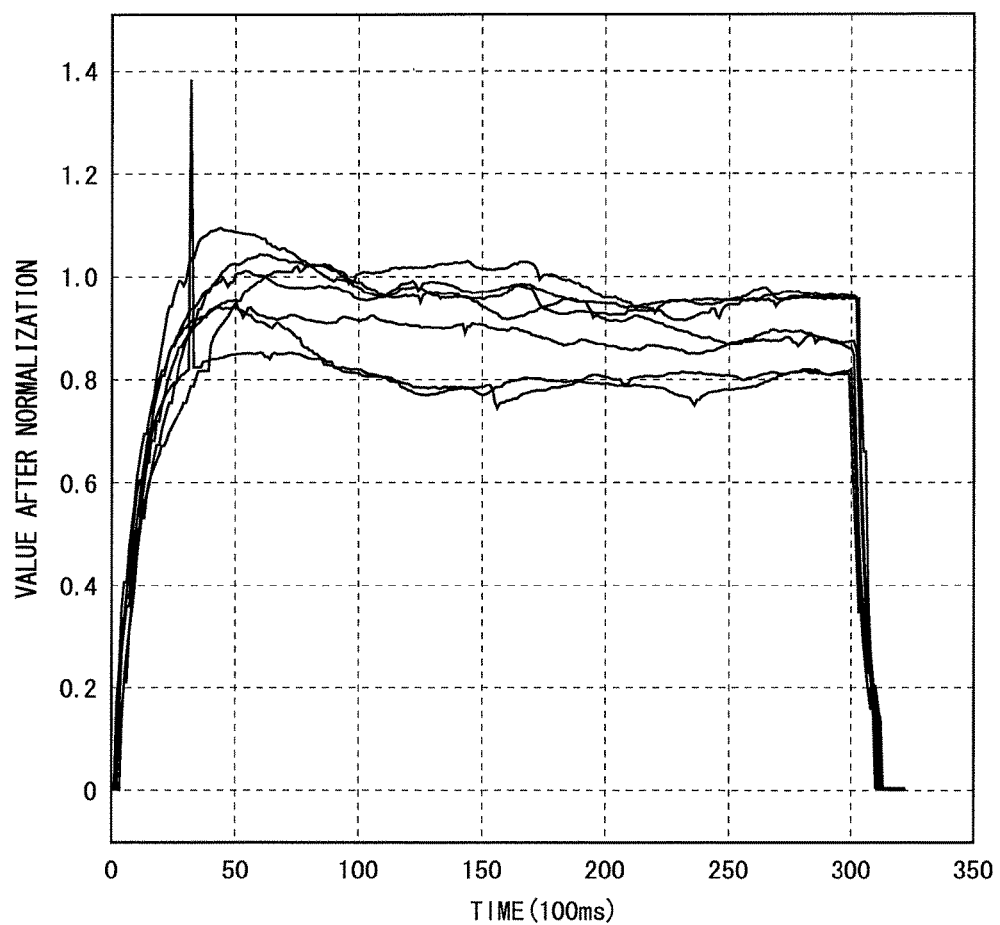
FIG. 17 is a diagram illustrating a result of performing normalization according to the present embodiment on the group illustrated in FIG. 14.

When the normalization according to the present embodiment is performed on the first group, a result illustrated in FIG. 9 is obtained. FIG. 17 is a diagram illustrating a result of performing the normalization according to the present embodiment on the second group. In this case, an abnormality degree of the first group is 17.290, and an abnormality degree of the second group is 17.416, and the abnormality degree of the second group becomes larger than the abnormality degree of the first group. Thus, according to the time-series data processing device 10, it is possible to obtain a more preferable abnormality degree of the group than in the case of performing the conventional normalization. Further, noise included in the original time-series data can be left in the normalized time-series data.

Note that in the normalization according to the present embodiment, the normalized data is larger than 1 when the data before the normalization is larger than the maximum value Mmax, and the normalized data is smaller than 0 when the data before the normalization is smaller than the minimum value Mmin. In steps S160 and S170, the CPU 21 evaluates the abnormality degree of the group and the abnormality degree of the time-series data not in an absolute manner but in a relative manner (mutually compares the abnormality degrees). For this reason, even when the normalized data is larger than 1 or smaller than 0, it does not affect the comparison of the abnormality degrees.

Further, in step S140, the CPU 21 calculates the abnormality degree of the group based on the difference between pieces of data of the same time of the pairs of the time-series data. Meanwhile, as an index indicating a similarity of the time-series data, there is known AMSS (Angular Metrics for Shape Similarity) which is based on a difference in a vector direction indicating a change in data. In step S140, the CPU 21 calculates an abnormality degree based, not on an index such as AMSS based on a difference in vector direction, but on a difference between data (Euclidean distance). Thus, according to the time-series data processing device 10, the user can obtain an abnormality degree of a group which is similar to that obtained at the time of analyzing the time-series data by manual calculation.

Further, the time-series data processing device 10 calculates an abnormality degree of the time-series data based on normalized time-series data, and displays a time-series data ranking based on the abnormality degree of the time-series data. Thus, the user can recognize abnormal time-series data easily. Moreover, in step S150, the CPU 21 calculates, as an abnormality degree of time-series data, a sum of differences in pieces of data of the same time between the time-series data and the median-value time-series data. Hence it is possible to obtain a preferable abnormality degree of the time-series data.

Note that in the time-series data processing device 10, in step S140, the CPU 21 obtains the maximum value of average values of differences between pieces of data of the same time as the abnormality degree of the group. In place of this, as the abnormality degree of the group, the CPU 21 may obtain another value, for example, an average value of average values of differences between pieces of data of the same time. Further, in the time-series data processing device 10, the group ranking includes a result of sorting the groups in descending order of abnormality degree. In place of this, the group ranking may include a rank order of abnormality degrees of the groups without sorting the groups. The same also applies to the time-series data ranking. Moreover, the time-series data processing device 10 stores the time-series data 7. In place of this, the time-series data 7 may be stored outside the device and supplied to the time-series data processing device 10 by using the communicating section 26.

As shown above, according to the time-series data processing method, the time-series data processing program, and the time-series data processing device according to the present invention, it is possible to display time-series data in such a manner as to facilitate the user to analyze the data.

Although the present invention has been described in detail above, the above descriptions are exemplary and are not restrictive in all aspects. It is understood that a large number of other alternations and modifications are devisable without deviating from the scope of the present invention.

This application claims priority based on Japanese Patent Application No. 2015-209607 filed on Oct. 26, 2015, and entitled "Time-Series Data Processing Method, Time-Series Data Processing Program, And Time-Series Data Processing Device", which is incorporated herein by reference in its entirety.

What is claimed is:

1. A time-series data processing method for processing a plurality of pieces of time-series data, the method comprising:
a group generating step of generating a plurality of groups each group in the plurality of groups being made up of a plurality of pieces of time-series data that change in a similar manner, based on a given plurality of pieces of time-series data, each piece in the plurality of pieces of time-series data including a plurality of values;
a normalization step of normalizing, for each group, the time-series data in the group by the same transformation to produce a plurality of pieces of normalized time-series data;
an abnormality degree calculating step of calculating, for each group, an abnormality degree of the group based on the produced plurality of pieces of normalized time-series data;
a ranking generating step of generating a group ranking to obtain a group ranking of the groups, the group ranking of the groups being based on the abnormality degrees of the groups; and
a result displaying step of displaying a screen that includes the group ranking of the groups.

2. The time-series data processing method according to claim 1, wherein the abnormality degree calculating step obtains, for each group, an average value of differences between pieces of data of the same time for every combination of two pieces of time-series data in the group, to take a maximum value of the obtained average values as an abnormality degree of the group.

3. The time-series data processing method according to claim 2, wherein the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively.

4. The time-series data processing method according to claim 1, wherein
the abnormality degree calculating step calculates, for each time-series data in each group, an abnormality degree of the time-series data based on the normalized time-series data,
the ranking generating step generates, for each group, a time-series data ranking based on the abnormality degrees of the time-series data, and
the result displaying step displays a screen that includes the time-series data ranking for a group selected by a display control instruction.

5. The time-series data processing method according to claim 4, wherein the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively, and the abnormality degree calculating step takes, for each time-series data in each group, a sum of differences in pieces of data of the same time between the time-series data and the median-value time-series data, as an abnormality degree of the time-series data.

6. The time-series data processing method according to claim 4, wherein the screen that includes the group ranking includes link information for displaying a screen that includes the time-series data ranking.

7. A computer readable recording medium having recorded thereon a time-series data processing program for processing a plurality of pieces of time-series data, the time-series data processing program causing a computer to execute, by a CPU using a memory:

a group generating step of generating a plurality of groups each group in the plurality of groups being made up of a plurality of pieces of time-series data that change in a similar manner, based on a given plurality of pieces of time-series data, each piece in the plurality of pieces of time-series data including a plurality of values;

a normalization step of normalizing, for each group, the time-series data in the group by the same transformation to produce a plurality of pieces of normalized time-series data;

an abnormality degree calculating step of calculating, for each group, an abnormality degree of the group based on the produced plurality of pieces of normalized time-series data;

a ranking generating step of generating a group ranking to obtain a group ranking of the groups, the group ranking of the groups being based on the abnormality degrees of the groups; and a result displaying step of displaying a screen that includes the group ranking of the groups.

8. The computer readable recording medium according to claim 7, wherein the abnormality degree calculating step obtains, for each group, an average value of differences between pieces of data of the same time for every combination of two pieces of time-series data in the group, to take a maximum value of the obtained average values as an abnormality degree of the group.

9. The computer readable recording medium according to claim 8, wherein the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively.

10. The computer readable recording medium according to claim 7, wherein the abnormality degree calculating step calculates, for each time-series data in each group, an abnormality degree of the time-series data based on the normalized time-series data, the ranking generating step generates, for each group, a time-series data ranking based on the abnormality degrees of the time-series data, and the result displaying step displays a screen that includes the time-series data ranking for a group selected by a display control instruction.

11. The computer readable recording medium according to claim 10, wherein the normalization step generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively, and the abnormality degree calculating step takes, for each time-series data in each group, a sum of differences in pieces of data of the same time between the time-series data and the median-value time-series data, as an abnormality degree of the time-series data.

12. The computer readable recording medium according to claim 10, wherein the screen that includes the group ranking includes link information for displaying a screen that includes the time-series data ranking.

13. A time-series data processing device for processing a plurality of pieces of time-series data, the device comprising:

a group generating section for generating a plurality of groups each group in the plurality of groups being made up of a plurality of pieces of time-series data that change in a similar manner, based on a given plurality of pieces of time-series data, each piece in the plurality of pieces of time-series data including a plurality of values;

a normalization section for normalizing, for each group, the time-series data in the group by the same transformation to produce a plurality of pieces of normalized time-series data;

an abnormality degree calculating section for calculating, for each group, an abnormality degree of the group based on the produced plurality of pieces of normalized time-series data;

a ranking generating section for generating a group ranking to obtain a group ranking of the groups, the group ranking of the groups being based on the abnormality degrees of the groups; and a result displaying section for displaying a screen that includes the group ranking of the groups.

14. The time-series data processing device according to claim 13, wherein the abnormality degree calculating section obtains, for each group, an average value of differences between pieces of data of the same time for every combination of two pieces of time-series data in the group, to take a maximum value of the obtained average values as an abnormality degree of the group.

15. The time-series data processing device according to claim 14, wherein the normalization section generates, for each group, median-value time-series data made up of median values of pieces of data of the same time included in the time-series data in the group, to linearly transform data included in the time-series data in the group so that a maximum value and a minimum value of the median values included in the median-value time-series data are transformed to 1 and 0, respectively.

* * * * *